United States Patent
Reddy et al.

(10) Patent No.: US 7,328,756 B2
(45) Date of Patent: Feb. 12, 2008

(54) SETTABLE FLUIDS COMPRISING PARTICLE-SIZE DISTRIBUTION-ADJUSTING AGENTS AND METHODS OF USE

(75) Inventors: B. Raghav Reddy, Duncan, OK (US); Anthony V. Palmer, Ardmore, OK (US); Ashok K. Santra, Duncan, OK (US)

(73) Assignee: Halliburton Energy Serivces, Inc., Duncan, OK (US)

( * ) Notice: Subject to any disclaimer, the term of this patent is extended or adjusted under 35 U.S.C. 154(b) by 31 days.

(21) Appl. No.: 10/946,671

(22) Filed: Sep. 22, 2004

(65) Prior Publication Data

US 2005/0155795 A1 Jul. 21, 2005

Related U.S. Application Data

(62) Division of application No. 10/759,678, filed on Jan. 16, 2004.

(51) Int. Cl.
*C09K 8/02* (2006.01)
(52) U.S. Cl. ...................................... 175/72
(58) Field of Classification Search ............... None
See application file for complete search history.

(56) References Cited

U.S. PATENT DOCUMENTS

| | | | |
|---|---|---|---|
| 3,132,693 A | 5/1964 | Weisend | 166/33 |
| 3,359,225 A | 12/1967 | Weisend | 260/29.6 |
| 3,508,407 A | 4/1970 | Booth | 61/35 |
| 3,959,003 A | 5/1976 | Ostroot et al. | 106/93 |
| 4,131,480 A | 12/1978 | McCurrich et al. | 106/93 |
| 4,215,001 A | 7/1980 | Elphingstone et al. | 252/8.55 C |
| 4,231,882 A | 11/1980 | Elphingstone et al. | 252/8.55 C |
| 4,304,298 A | 12/1981 | Sutton | 166/293 |
| 4,340,427 A | 7/1982 | Sutton | |
| 4,367,093 A | 1/1983 | Burkhalter et al. | 106/87 |
| 4,393,939 A | 7/1983 | Smith et al. | 166/293 |
| 4,450,009 A | 5/1984 | Childs et al. | 106/76 |
| 4,450,010 A | 5/1984 | Burkhalter et al. | 106/87 |
| 4,461,644 A | 7/1984 | Childs et al. | 106/76 |
| 4,495,228 A | 1/1985 | Cornwell | |

(Continued)

FOREIGN PATENT DOCUMENTS

BR 2000006841 7/2002

(Continued)

OTHER PUBLICATIONS

Foreign communication from a related counterpart application Oct. 4, 2005.

(Continued)

*Primary Examiner*—Zakiya W. Bates
(74) *Attorney, Agent, or Firm*—Craig W. Roddy; Baker Botts, LLP (57) ABSTRACT

Settable fluids comprising particle-size distribution-adjusting agents, and methods of using such settable fluids in subterranean and surface applications are provided. In certain exemplary embodiments, the settable fluid comprises a cement, a set retarder, and a particle-size distribution-adjusting agent. Exemplary methods include, but are not limited to, methods of drilling with the settable fluids, methods of cementing with the settable fluids, and methods of using a settable fluid to displace another fluid from a well bore in a subterranean formation.

45 Claims, 6 Drawing Sheets

U.S. PATENT DOCUMENTS

| | | | |
|---|---|---|---|
| 4,515,216 A | 5/1985 | Childs et al. | 166/293 |
| 4,524,828 A | 6/1985 | Sabins et al. | 166/293 |
| 4,565,578 A | 1/1986 | Sutton et al. | 106/87 |
| 4,584,327 A | 4/1986 | Sutton | |
| 4,676,832 A | 6/1987 | Childs et al. | 106/90 |
| 4,764,019 A | 8/1988 | Kaminski et al. | 366/15 |
| 4,818,288 A | 4/1989 | Aignesberger et al. | 106/90 |
| 5,016,711 A | 5/1991 | Cowan | |
| 5,112,603 A | 5/1992 | Nadolsky et al. | 514/772.3 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,151,203 A | 9/1992 | Riley et al. | 252/8.551 |
| 5,238,064 A | 8/1993 | Dahl et al. | 166/293 |
| 5,263,542 A | 11/1993 | Brothers | 166/293 |
| 5,275,654 A | 1/1994 | Cowan | |
| 5,281,023 A | 1/1994 | Cedillo et al. | |
| 5,295,543 A | 3/1994 | Terry et al. | 166/293 |
| 5,298,070 A | 3/1994 | Cowan | |
| 5,325,922 A * | 7/1994 | Cowan et al. | 166/293 |
| 5,327,968 A | 7/1994 | Onan et al. | 166/293 |
| 5,339,903 A | 8/1994 | Eoff et al. | 166/293 |
| 5,355,954 A | 10/1994 | Onan et al. | 166/292 |
| 5,383,521 A | 1/1995 | Onan et al. | 166/293 |
| 5,421,409 A | 6/1995 | Mueller et al. | 166/292 |
| 5,441,340 A | 8/1995 | Cedillo et al. | |
| 5,447,197 A | 9/1995 | Rae et al. | 166/293 |
| 5,458,195 A | 10/1995 | Totten et al. | 166/293 |
| 5,501,277 A | 3/1996 | Onan et al. | 166/293 |
| 5,503,473 A | 4/1996 | Dearing, Sr. et al. | |
| 5,547,506 A | 8/1996 | Rae et al. | 106/730 |
| 5,569,324 A | 10/1996 | Totten et al. | 106/696 |
| 5,588,488 A | 12/1996 | Vijn et al. | |
| 5,590,958 A | 1/1997 | Dearing, Sr. et al. | |
| 5,624,182 A | 4/1997 | Dearing, Sr. et al. | |
| 5,672,203 A | 9/1997 | Chatterji et al. | 106/808 |
| 5,711,383 A | 1/1998 | Terry et al. | 175/72 |
| 5,749,418 A | 5/1998 | Mehta et al. | 166/292 |
| 5,775,803 A | 7/1998 | Montgomery et al. | |
| 5,834,533 A | 11/1998 | Patel et al. | |
| 5,871,577 A | 2/1999 | Chatterji et al. | 106/808 |
| 5,900,053 A | 5/1999 | Brothers et al. | 106/678 |
| 5,968,255 A | 10/1999 | Mehta et al. | 106/724 |
| 5,972,103 A | 10/1999 | Mehta et al. | 106/728 |
| 6,063,738 A | 5/2000 | Chatterji et al. | 507/269 |
| 6,087,318 A | 7/2000 | Yamashita et al. | |
| 6,089,318 A | 7/2000 | Laramay et al. | |
| 6,138,759 A | 10/2000 | Chatterji et al. | 166/293 |
| 6,143,069 A | 11/2000 | Brothers et al. | 106/678 |
| 6,153,005 A | 11/2000 | Welker et al. | |
| 6,172,147 B1 | 1/2001 | Abelleira et al. | |
| 6,173,778 B1 | 1/2001 | Rae et al. | |
| 6,228,832 B1 | 5/2001 | Kinscherf et al. | 510/417 |
| 6,230,804 B1 | 5/2001 | Mueller et al. | 166/293 |
| 6,315,042 B1 | 11/2001 | Griffith et al. | 166/291 |
| 6,332,921 B1 | 12/2001 | Brothers et al. | 106/692 |
| 6,367,550 B1 | 4/2002 | Chatterji et al. | 166/293 |
| 6,402,832 B1 | 6/2002 | Vijayendran et al. | 106/778 |
| 6,457,523 B1 | 10/2002 | Vijn et al. | 166/293 |
| 6,458,198 B1 | 10/2002 | Baret et al. | 106/644 |
| 6,488,763 B2 | 12/2002 | Brothers et al. | 106/692 |
| 6,491,421 B2 | 12/2002 | Rondeau et al. | |
| 6,494,263 B2 * | 12/2002 | Todd | 166/312 |
| 6,511,537 B1 | 1/2003 | Barlet-Gouedard et al. | 106/727 |
| 6,524,384 B2 | 2/2003 | Griffith et al. | 106/705 |
| 6,610,140 B2 | 8/2003 | Vijn et al. | 106/738 |
| 6,666,268 B2 | 12/2003 | Griffith et al. | 166/292 |
| 6,668,929 B2 | 12/2003 | Griffith et al. | 166/292 |
| 6,702,044 B2 * | 3/2004 | Reddy et al. | 175/64 |
| 6,716,282 B2 | 4/2004 | Griffith et al. | 106/705 |
| 6,767,867 B2 * | 7/2004 | Chatterji et al. | 507/216 |
| 6,786,629 B2 | 9/2004 | Rondeau et al. | |
| 6,796,378 B2 | 9/2004 | Reddy et al. | |
| 2002/0093875 A1 | 7/2002 | Rondeau et al. | |
| 2003/0072208 A1 | 4/2003 | Rondeau et al. | |
| 2004/0100858 A1 | 5/2004 | Rondeau et al. | |
| 2005/0166803 A1 | 8/2005 | Dillenbeck et al. | |

FOREIGN PATENT DOCUMENTS

| | | |
|---|---|---|
| CN | 1221773 | 7/1999 |
| CN | 1239085 | 12/1999 |
| CN | 1258763 | 7/2000 |
| CN | 1385161 | 2/2002 |
| CN | 1385388 | 12/2002 |
| DE | 3213799 | 11/1982 |
| DE | 19729305 | 1/1999 |
| EP | 1243253 | 9/2002 |
| IT | 490478 | 2/1954 |
| JP | 59109663 | 6/1984 |
| JP | 61256956 | 11/1986 |
| JP | 05043293 | 2/1991 |
| JP | 06128001 | 5/1994 |
| JP | 09020536 | 1/1997 |
| JP | 2000191350 | 7/2000 |
| JP | 20033277789 | 10/2003 |
| RO | 115535 | 3/2000 |
| RU | 2181585 | 4/2002 |
| RU | 2208046 | 7/2003 |

OTHER PUBLICATIONS

Office action dated Dec. 5, 2006 from U.S. Appl. No. 10/759,678.

"Effect of mix rheology, admixtures, and salts on physical and mechanical properties of hardened cement pastes," Scheetz et al., Int. Congr. Chem. Cem. (Proc), 7$^{th}$, (1980), vol. 3, VI/170-VI175—Answer 1 of 3 of Chemical Abstracts.

Santra, Ashok et al.,"Methods of Preparing Settable Fluids Comprising Particle-Size Distribution-Adjusting Agents, and . . . " filed Aug. 14, 2006 as U.S. Appl. No. 11/503,634.

Office action dated Feb. 16, 2006 from U.S. Appl. No. 10/759,678.

Office action dated Nov. 9, 2005 from U.S. Appl. No. 10/759,678.

Office action dated Apr. 27, 2005 from U.S. Appl. No. 10/759,678.

Office action dated Nov. 10, 2004 from U.S. Appl. No. 10/759,678.

Office action dated Aug. 19, 2004 from U.S. Appl. No. 10/759,678.

Office action dated Jun. 27, 2006 from U.S. Appl. No. 10/759,678.

Abstract of Owsiak, Z., "Alkali-aggregate reaction in concrete containing hig-alkali cement and . . . ," Cement and Concrete Research, 34(1):7-11 (2004) full paper attached.

Abstract of Lorenzo, P. et al., "Effect of Fly Ashes with High Total Alkali Content on . . . ," Journal of the American Ceramic Society (1996), 79(2), 470-4, full copy attached.

Abstract of Linklater, C.M. et al., "A natural analogue of high-pH cement pore waters from . . . ," Journal of Contaminant Hydrology (1996), 21(1-4), 59-69, full copy attached.

Abstract of Krivenko, P.V., "Alkaline Cements," Int. Congr. Cem., 9th (1992) 4 482-8, full copy attached.

Abstract of Lu, Chunxuan et al., "How to Make Better Use of Cement Raw Materials with Higher Alkali Content," Guisuanyan Xuebao (1993), 21(6) 554-63.

Abstract of Davidovits, J., "High-Alkali Cements for 21st Century Concretes," American Concrete Institute, SP-144 (Concrete Technology) 383-97 (1994), full copy attached.

Abstract of Chen, Xufeng et al., "Effect of Alkali on Hydration Process and Properties of Cement," Guizuanyan Xuebao (1993), 21(4), 301-8.

Abstract of Pugachev, G.A. et al., "Comparative Studies of the Strength of Highly Active Alkaline . . . ," Izvestiya Vysshikh Uchebnykh Zavedenii Stroitel stvo (1992), (9-10).

Abstract of Haruna, Junsuke, "High-Strength and Low-Drying Shrinkage Slag Alkali Cement," Kokai Tokkyo Koho (1992).

Abstract of Benshtein, Yu et al, "Evaluation of the Effectiveness of Quartz Additives to High-Alkali . . . ," Zhurnal Prikladnoi Khimii, 60(2):349-55 (1987), full copy attached.

Abstract of Spellman, Louis "Some Opportunities to Offset Poor Quality Characteristics of High . . . ," Cement, Concrete and Aggregates, (1983), 5(1), 73-6, full copy attached.

Abstract of Timashev, V.V. et al., "Characteristics of High-alkali Portland Cement Hydration in the Presence of Phosphorus-Containing . . . ," Tr. VNII Tsement. Prom-sti (1981).

Abstract of Kryzhanovskaya, I.A., et al., "Alkali Compounds in Clinker and Setting of Highly Alkaline Portland Cements," Yuzhgiprotsement (1971), 12 65-79.

Abstract of Luginina, I.G. et al., "Cause of the Rapid Hardening Of High-Alkali Cements," Tsement (1971), (10), 17-18.

Halliburton brochure entitled "CFR-3 Cement Friction Reducer Dispersant" dated 1998.

Halliurton brochure entitled "CFR-6 Cement Friction Reducer" dated 2000.

Halliburton brochure entitled "Halad®-9 Fluid-Loss Additive" dated 1999.

Halliburton brochure entitled "MicroBond Expanding Additive for Cement" dated 1999.

Halliburton brochure entitled "MicroBond HT Cement Additive" dated 1999.

Halliburton brochure entitled "MicroBond M Cement Additive" dated 1999.

Halliburton brochure entitled "Super CBL Additive Cement Additive" Dated 1999.

Halliburton brochure entitled "Thermalock™ Cement for Corrosive $CO_2$ Environments" dated 1999.

Halliburton brochure entitled "GasStop Gas Migration Control Additive" Dated 1999.

Halliburton brochure entitled "GasStop HT Cement Additive" dated 1999.

Publication entitled "Cryogenics with cement microscopy redefines Cement behavior" by Sudhir Mehta, et al. published in the Oil & Gas Journal, pp. 47-53, undated.

Paper entitled "Electroless copper layers: physical properties and bath composition", Afinidad 2001, 58 (496) 427-430 Julve (abstract only).

Paper entitled "Possibilities of utilizing cationic starch in food production", Palasinski, Inst. Podstaw Chem. Technolo. Zywn AR-Pol. Przemysl SPozywczy (1982), 36(3), 95-96 (abstract only).

Paper entitled "Electrochemical reduction of indigo in a dyeing bath", Yu et al., Huagong Shikan (2002), 16(1), 27-29 (abstract only).

Office Action dated Jul. 13, 2007 from U.S. Appl. No. 10/759,678.

* cited by examiner

Sample Compositions 14-16

Figure 6

Time to 500 Psi Strength Development for Sample Compositions 14-16

SETTABLE FLUIDS COMPRISING PARTICLE-SIZE DISTRIBUTION-ADJUSTING AGENTS AND METHODS OF USE

CROSS-REFERENCE TO RELATED APPLICATION

This application is a divisional patent application of commonly-owned U.S. patent application Ser. No. 10/759,678, filed Jan. 16, 2004, entitled "Settable Fluids Comprising Particle-Size Distribution-Adjusting Agents and Methods of Use," by B. Raghava Reddy, et al., which is incorporated by reference herein for all purposes.

BACKGROUND

The present invention relates to subterranean operations, and more particularly, to settable fluids comprising particle-size distribution-adjusting agents, and methods of using such settable fluids.

Hydraulic cement compositions are commonly utilized in subterranean operations, particularly subterranean well completion and remedial operations. For example, hydraulic cement compositions are used in primary cementing operations whereby pipe strings, such as casings and liners, are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

Set-delayed cement compositions are often utilized in circumstances where an operator finds it desirable to prepare a volume of a cement composition that remains in a pumpable state for a long period of time (e.g., for about two weeks or more), and that can be selectively activated to set into a hard mass at a desired time. For example, in circumstances where very large volumes of cement are utilized (such as in offshore platform grouting), the equipment required for mixing and pumping the requisite large volumes of cement composition may be very expensive, and may be difficult to assemble at the desired location. The storage of the requisite amount of dry cement prior to use may be another problem. As another example, the use of a set-delayed cement composition may also be desirable in circumstances where a relatively small volume of cement composition is used, such as a small construction job, for example, or a plugging and squeezing operation performed in the petroleum industry, for instance. In such circumstances, the cost to transport the cement composition to a job site, and to mix and pump it on location may be undesirable relative to the revenue generated from performing the cementing operation. Set-delayed cement compositions may be useful in circumstances such as those described above, as they can be prepared at a convenient location, then transported to and stored at a job site until use. At a desired time, the set-delayed cement composition may be mixed with a set activating agent; the resulting mixture may then be placed into a desired location (e.g., into a subterranean formation) and permitted to set therein. In some formulations, an excessive amount of set-activating agents have been injected into the set-delayed cement compositions, thereby "overactivating" the cement composition, after which a retarder is then added to the cement composition, in an attempt to fine-tune the eventual set time of the cement composition.

Operations involving conventional set-delayed cement compositions may encounter a number of difficulties. For example, the cement composition may thicken or gel with time, increasing the cement composition's viscosity, and thus impairing its pumpability. Another difficulty is that the activation process may be quite complicated, as exemplified by operations wherein the cement composition's set-time is first delayed until shortly before use, after which the cement composition is over-activated and again retarded.

Another problem that may occur with conventional set-delayed cement compositions is that the addition of set-activating agents may cause premature localized setting of the cement, e.g., localized regions within the bulk cement slurry wherein the set-activating agent becomes concentrated, thereby causing premature setting of a portion of the bulk cement. Such premature localized setting of the cement composition may be likely to occur when the cement composition is inadequately mixed. Premature localized setting of the cement composition may lead to pumping problems (e.g., hardened cement particles may damage pump impellers), and may also cause problems such as setting of the bulk cement while in storage tanks.

An additional difficulty posed by conventional set-delayed cement compositions is that the performance of the set-activating agents commonly used to selectively activate the cement compositions may be unpredictable. This may cause problems such as premature setting of the cement before placement (where the activating agent imparts an unexpectedly strong activating effect), or delayed setting of the cement after placement (where the activating agent imparts an unexpectedly weak activating effect). Both are undesirable.

SUMMARY

The present invention relates to subterranean operations, and more particularly, to settable fluids comprising particle-size distribution-adjusting agents, and methods of using such settable fluids.

An example of a method of the present invention is a method of cementing, comprising the steps of: providing a cement composition comprising a hydraulic cement, a set retarder, and a particle-size distribution-adjusting agent; activating the cement composition; placing the cement composition in a desired location; and permitting the cement composition to set therein.

Another example of a method of the present invention is a method of drilling in a subterranean formation comprising the step of drilling a well bore in a subterranean formation using a drilling fluid comprising a cement, a set retarder, and a particle-size distribution-adjusting agent.

Another example of a method of the present invention is a method of using a fluid in a subterranean formation comprising the steps of: placing a displacement fluid comprising a cement, a set retarder, a particle-size distribution-adjusting agent, and an activator composition in a well bore in a subterranean formation so as to displace a second fluid therefrom.

An example of a composition of the present invention is a settable fluid comprising a hydraulic cement, a set retarder, and a particle-size distribution-adjusting agent.

Another example of a composition of the present invention is an activator composition for activating a settable fluid comprising a mixture of triethanolamine and an alkali metal hydroxide.

Another example of a composition of the present invention is a particle-size distribution-adjusting agent for adjusting the particle-size distribution of a settable fluid to a desired range, the particle-size distribution-adjusting agent comprising a cationic polymer.

The features and advantages of the present invention will be readily apparent to those skilled in the art upon a reading of the description of exemplary embodiments, which follows.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific exemplary embodiments thereof have been shown in the drawings and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to subterranean operations, and more particularly, to settable fluids comprising particle-size distribution-adjusting agents, and methods of using such settable fluids.

The settable fluids of the present invention generally comprise a cement, water, a set retarder, and a particle-size distribution-adjusting agent. Optionally, other additives suitable for use in a settable fluid may be added. Generally, the settable fluids of the present invention have a density in the range of from about 4 to about 25 pounds per gallon. In certain exemplary embodiments, the settable fluids of the present invention have a density in the range of from about 10 to about 25 pounds per gallon.

Any cements suitable for use in subterranean applications are suitable for use in the present invention. Furthermore, any cements suitable for use in surface applications, e.g., construction cements, are suitable for use in the present invention. In certain exemplary embodiments, the improved settable fluids of the present invention comprise a hydraulic cement. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolana cements, gypsum cements, high alumina content cements, silica cements, and high alkalinity cements.

The water present in the settable fluids of the present invention may be from any source provided that it does not contain an excess of compounds that adversely affect other compounds in the settable fluids. For example, a settable fluid of the present invention can comprise fresh water, salt water (e.g., water containing one or more salts dissolved therein), brine (e.g., saturated salt water), or seawater. The water may be present in an amount sufficient to produce a pumpable slurry. Generally, the water is present in the settable fluids of the present invention in an amount in the range of from about 25% to about 150% by weight of cement ("bwoc") therein. In certain exemplary embodiments, the water is present in the settable fluids of the present invention in an amount in the range of from about 40% to about 55% bwoc therein.

The particle-size distribution-adjusting agent in the settable fluids of the present invention may be any compound that desirably affects the particle-size distribution of the settable fluid such that the settable fluid's rheology remains desirably stable for a chosen period of time. Among other benefits, the presence of the particle-size distribution-adjusting agent in the settable fluids may forestall the onset of gelation for a desired period of time. Accordingly, certain embodiments of the settable fluids of the present invention are capable of remaining stable in a slurry state for several weeks or more before being activated by the addition of an activator composition. Among other benefits, the presence of the particle-size distribution-adjusting agent in the settable fluid tends to cause smaller particles in the settable fluid to agglomerate, thereby tending to narrow the distribution range of the size of the particles in the settable fluid. One example of a suitable particle-size distribution-adjusting agent is a cationic polymer. Examples of cationic polymers suitable for use with the present invention include, but are not limited to, cationic polyacrylamides, cationic hydroxyethyl cellulose, poly(dimethyldiallylammonium chloride), and cationic starches. In an exemplary embodiment, the cationic polymer used in the settable fluids of the present invention is a cationic starch. A commercially available example of a cationic starch is available under the tradename "REDIBOND 5330 A," from National Starch Co. of Bridgewater, Connecticut. Generally, the particle-size distribution-adjusting agent may be present in the settable fluid in an amount sufficient to adjust the particle-size distribution of the settable fluid to a desired range. More particularly, the particle-size distribution-adjusting agent may be present in the settable fluid in an amount in the range of from about 0.01% to about 4% bwoc.

The settable fluids of the present invention further comprise a set retarder. Generally, any set retarder may be used with the settable fluids of the present invention. In certain exemplary embodiments, the set retarders used in the present invention comprise phosphonic acid derivatives, such as those that are described in U.S. Pat. No. 4,676,832, the relevant disclosure of which is hereby incorporated herein. Commercially available examples of a suitable set retarder include those available from Monsanto Corporation of St. Louis, Mo. under the tradename "DEQUEST." In certain exemplary embodiments of the present invention, a sodium salt of a phosphonic acid commercially available from Monsanto Corporation of St. Louis, Mo. under the tradename "DEQUEST 2006" is used. Generally, the set retarder is present in the settable fluids of the present invention in an amount in the range of from about 0.1% to about 5% bwoc.

Optionally, the settable fluids of the present invention may further comprise a yield stress reducing agent. The use of such yield stress reducing agents may be particularly beneficial in certain exemplary embodiments where a densified settable fluid is used. Among other benefits, the use of a yield stress reducing agent may facilitate pumping of the densified settable fluid, inter alia, by reducing the force required to move the densified settable fluid from a static position. While the present invention is not limited by any particular theory, it is believed that the yield stress reducing agent, inter alia, increases the repulsive force between cement particles, thereby preventing them from approaching each other. An example of a suitable yield stress reducing agent is a sulfonated melamine formaldehyde condensate that is commercially available under the tradename "MELA-DYNE" from Handy Chemicals, Ltd., of Beachwood, Ohio. Another example of a suitable yield stress reducing agent is a sulfite adduct of an acetone formaldehyde condensate, commercially available from Halliburton Energy Services, Inc., of Duncan, Okla., under the tradename "CFR-3." Another example of a suitable yield stress reducing agent is a sulfonated naphthalene condensate, commercially available from Halliburton Energy Services, Inc., of Duncan, Okla., under the tradename "CFR-6." One of ordinary skill in the art, with the benefit of this disclosure, will be able to identify a suitable yield stress reducing agent for a particular application.

Optionally, the settable fluids of the present invention may further comprise an expanding additive. The expanding additive may be any component suitable for incorporating gas into the settable fluid. Where the expanding additive is a gas, gasification of the settable fluid may be achieved at the surface in one preferred embodiment, and the gasified settable fluid may be then introduced into the subterranean formation and permitted to set therein into a resilient, ductile, and tough gasified cement mass. Alternatively, the settable fluid may be gasified during, or after, its placement in the subterranean formation, by the inclusion of a particular expanding additive within the settable fluid. Where an expanding additive in particulate form is used, aluminum powder, gypsum blends, and deadburned magnesium oxide are preferred. Preferred expanding additives comprising aluminum powder are commercially available under the tradenames "GAS-CHEK®" and "SUPER CBL" from Halliburton Energy Services, Inc., of Duncan, Okla.; a preferred expanding additive comprising a blend containing gypsum is commercially available under the tradename "MICROBOND" from Halliburton Energy Services, Inc., of Duncan, Okla.; and preferred expanding additives comprising deadburned magnesium oxide are commercially available under the tradenames "MICROBOND M" and "MICROBOND HT" from Halliburton Energy Services, Inc., of Duncan, Okla. Such preferred expanding additives are described in commonly-owned U.S. Pat. Nos. 4,304,298; 4,340,427; 4,367,093; 4,450,010; and 4,565,578, the relevant disclosures of which are hereby incorporated herein by reference. One of ordinary skill in the art, with the benefit of this disclosure, will be able to determine the appropriate amount of expanding additive to include in the settable fluids of the present invention for a particular application.

Where the settable fluids of the present invention are to be foamed (e.g., to reduce the density of the settable fluid, or to improve its mechanical properties), the settable fluid is foamed in one exemplary embodiment by direct addition of the expanding additive into the settable fluid. For instance, where the settable fluid is foamed by the direct injection of gas into the composition, the gas utilized can be air or any suitable inert gas, such as nitrogen, or even a mixture of such gases. In certain exemplary embodiments, nitrogen is used. Where foaming is achieved by direct injection of gas, the gas may be present in the composition in an amount sufficient to foam the composition, generally in an amount in the range of from about 0.01% to about 60% by volume of the composition. In another preferred embodiment, the settable fluid is foamed by gas generated by a reaction between the cement slurry and an expanding additive present in the settable fluid in particulate form. For example, the composition may be foamed by hydrogen gas generated in situ as the product of a reaction between the slurry and fine aluminum powder present in the settable fluid. To stabilize the foam, surfactants optionally may be added to the settable fluid. Surfactant compositions suitable for use in the present invention are described in U.S. Pat. Nos. 6,063,738 and 6,367,550, the relevant disclosures of which are hereby incorporated herein by reference.

Additional additives may be added to the settable fluids of the present invention as deemed appropriate by one skilled in the art with the benefit of this disclosure. Examples of such additives include, inter alia, fluid loss control additives, salts, vitrified shale, fly ash, fumed silica, bentonite, fixed-density weighting agents, and the like. An example of a suitable fluid loss control additive is commercially available from Halliburton Energy Services, Inc., of Duncan, Okla., under the tradename "HALAD®9."

To ready the settable fluids of the present invention for use (e.g., surface use, or placement in a subterranean formation, for example), an activator composition of the present invention may be added. The activator compositions of the present invention generally comprise a mixture of at least one alkali or alkaline earth metal hydroxide, and a trialkanolamine. A wide variety of alkali or alkaline earth metal hydroxides are suitable for use in the present invention. In certain exemplary embodiments, the alkali or alkaline earth metal hydroxide is selected from the group consisting of sodium hydroxide and potassium hydroxide. A wide variety of trialkanolamines are suitable for use in the present invention. In certain exemplary embodiments, the trialkanolamine is selected from the group consisting of: triethanolamine ("TEA"), tripropanolamine, and triisopropanolamine. In certain exemplary embodiments, the trialkanolamine is TEA. Such combination has been found to provide a synergistic effect, resulting in settable fluids that achieve desirably high compressive strengths at a faster rate than would be achieved had the TEA or alkali metal hydroxide been added individually. In certain exemplary embodiments, the alkali metal hydroxide is sodium hydroxide. Generally, the activator composition may be added to a settable fluid of the present invention in an amount sufficient to enable the settable fluid to achieve a desired compressive strength and a desired thickening time. More particularly, the activator composition may be added to the settable fluid in an amount in the range of from about 0.1% to 5% bwoc. Generally, the alkali or alkaline earth metal hydroxide may be present in the activator composition in an amount in the range of from about 50% to about 99.9% by weight. Generally, the trialkanolamine may be present in the activator composition in an amount in the range of from about 0.1% to about 50% by weight.

The activator composition may be added in a variety of ways. For example, the activator composition may be added to the settable fluid while the latter is still in storage. In certain other exemplary embodiments, the activator composition may be injected into the settable fluid at the same time that the settable fluid is injected into the subterranean formation. Among other benefits, the injection of the activator composition while the settable fluid is injected into the formation may assist in minimizing the development within the settable fluid of localized regions having a high activator concentration.

In certain exemplary embodiments of the present invention, the settable fluid may be formulated as a "densified" settable fluid (e.g., formulated with a significantly higher density than that which is calculated to be necessary for its intended use) before the addition of the activator composition. Such a densified settable fluid may be provided in a variety of ways, such as through the addition of high-density particles, or by formulating the settable fluid with less water than necessary for its intended use. Among other benefits, the employment of a densified settable fluid will facilitate the addition of an activator composition in the form of a dilute solution. For example, if a settable fluid having a 16.4 lb/gallon density is required, a densified settable fluid having a density of, say, 17.0 lb/gallon or higher may be provided and activated with an activator composition diluted with sufficient water to ultimately provide the desired 16.4 lb/gallon slurry. Among other benefits, the addition of the activator composition in a dilute solution to a densified settable fluid may minimize the possibility of developing localized zones having excessive activator concentration due to inadequate mixing.

In one embodiment of the methods of the present invention, the settable fluids of the present invention may be used as a drilling fluid. A drilling fluid of the present invention comprising a cement, a set retarder, and a particle-size distribution-adjusting agent may be used to drill a subterranean formation, e.g., by circulating the drilling fluid while drilling a well in contact with a drill bit and a subterranean formation. In an exemplary embodiment, the drilling fluid is used to drill a well bore in a subterranean formation, after which casing is placed within the well bore. In this exemplary embodiment, an activator composition of the present invention is then mixed with the drilling fluid, and the drilling fluid is permitted to set behind the casing. Accordingly, an exemplary method of the present invention comprises the step of drilling a well bore in a subterranean formation using a drilling fluid comprising a cement, a set retarder, and a particle-size distribution-adjusting agent. Additional steps include, but are not limited to, placing a casing string within the well bore; mixing an activator composition of the present invention with the drilling fluid; and permitting the drilling fluid to set behind the casing string.

In another embodiment, the settable fluids of the present invention may be used as a displacement fluid. For example, a displacement fluid of the present invention comprising a cement, a set retarder, a particle-size distribution-adjusting agent, and an activator composition of the present invention may be placed in a well bore that has been drilled (with a drilling fluid) in a subterranean formation so as to partially or completely displace the drilling fluid from the well bore. Generally, after the displacement fluid has been placed in the well bore, a cement composition is subsequently placed in the well bore so as to partially or completely displace the displacement fluid therefrom. Any portion of the displacement fluid that is not displaced by the cement composition, and that inadvertently remains within the well bore, will develop sufficient compressive strength so as not to adversely affect the integrity of the resultant cement sheath. One of ordinary skill in the art, with the benefit of this disclosure, will be able to determine the appropriate balance of set retarder and activator composition such that the displacement fluid will not set for a desired period of time, and will then develop compressive strength thereafter. Accordingly, an exemplary method of the present invention comprises the steps of: placing a displacement fluid comprising a cement, a set retarder, a particle-size distribution-adjusting agent, and an activator composition in a well bore in a subterranean formation so as to displace a second fluid therefrom. Additional steps include, but are not limited to, placing a casing string within the well bore; placing a cement composition within the well bore so as to displace at least a portion of the displacement fluid therefrom; permitting the cement composition to set therein; and permitting any undisplaced displacement fluid to set therein.

Another example of a method of the present invention is a method of cementing, comprising the steps of: providing a cement composition comprising a hydraulic cement, a set retarder, and a particle-size distribution-adjusting agent; activating the cement composition; placing the cement composition in a desired location; and permitting the cement composition to set therein. Additional steps include, but are not limited to, permitting the cement composition to remain in a slurry state for at least twenty four hours before being activated; permitting the cement composition to remain in a slurry state for at least two weeks before being activated; and permitting the cement composition to remain in a slurry state for more than two weeks before being activated.

To facilitate a better understanding of the present invention, the following examples of some exemplary embodiments are given. In no way should such examples be read to limit the scope of the invention.

EXAMPLES

The cement slurry preparation, thickening time, free water content, and compressive strengths in the examples were measured according to API Specification 10A, Twenty-Third Edition, April, 2002.

Example 1

Sample Composition No. 1 comprised Class H cement, to which 34.52% water bwoc and 0.933% DEQUEST 2006 bwoc were added. Within four days, the viscosity of Sample Composition No. 1 had increased to such an extent that Sample Composition No. 1 could not be pumped.

TABLE 1

| | Fann 35 Rheometer Settings (rpm) | | | | | |
|---|---|---|---|---|---|---|
| Day | 600 | 300 | 200 | 100 | 6 | 3 |
| 0 | 234 | 128 | 92 | 51 | 8 | 6 |
| 1 | 245 | 150 | 110 | 68 | 25 | 20 |
| 3 | 275 | 182 | 145 | 103 | 55 | 47 |
| 4 | Too thick for rheology measurements | | | | | |

Example 2

Sample Composition No. 2 comprised Class H cement, to which 34.52% water bwoc was added. Next, 0.267% HALAD® 9 bwoc was added, along with 0.098% CFR-6 bwoc, 0.233% REDIBOND 5330 A bwoc, and 0.933% DEQUEST 2006 bwoc. The density of Sample Composition No. 2 was measured to be 17.0 lb/gallon.

Figure 1:
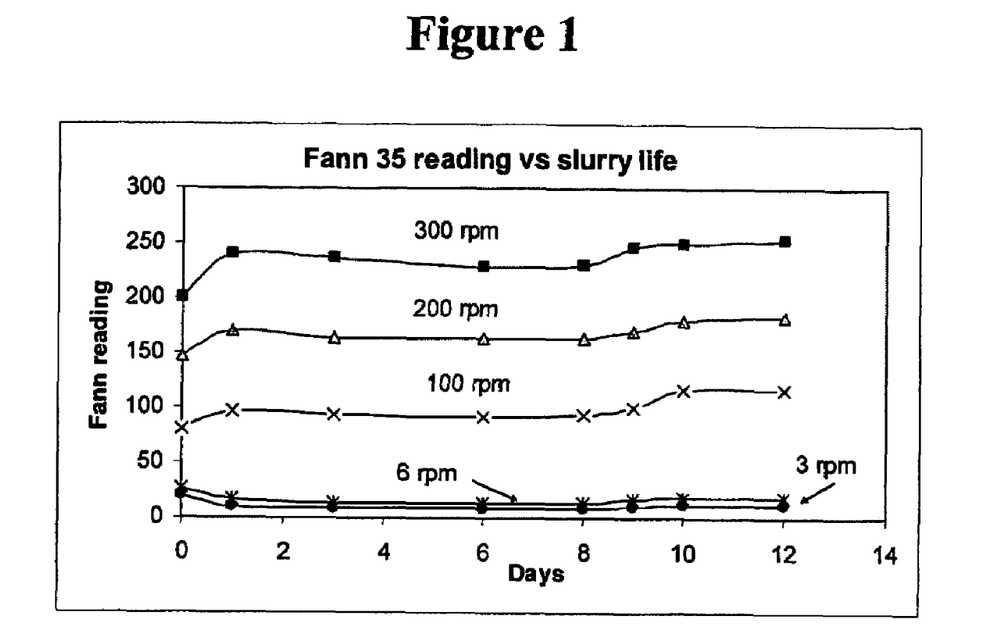
FIG. 1 depicts a graphical representation of the results of a rheology test performed on an exemplary embodiment of a settable fluid of the present invention.

The rheology of Sample Composition No. 2 was measured using a Fann 35 Rheometer viscometer. The results are set forth in the table below, as well as in FIG. 1.

TABLE 2

| | Fann 35 Rheometer Settings (rpm) | | | | | |
|---|---|---|---|---|---|---|
| Day | 600 | 300 | 200 | 100 | 6 | 3 |
| 0 | 346 | 200 | 146 | 80 | 26 | 20 |
| 1 | 440 | 240 | 170 | 96 | 16 | 10 |
| 3 | 430 | 236 | 164 | 94 | 14 | 8 |
| 6 | 414 | 228 | 164 | 92 | 14 | 8 |
| 8 | 410 | 230 | 164 | 94 | 14 | 8 |
| 9 | 430 | 246 | 170 | 100 | 16 | 10 |
| 10 | 444 | 250 | 180 | 116 | 18 | 12 |
| 12 | 450 | 253 | 184 | 116 | 18 | 12 |

On Day 13, Sample Composition No. 2 was too thick for its viscosity to be tested.

The above example demonstrates, inter alia, that the settable fluids of the present invention comprising particle-size distribution-adjusting agents may maintain their original rheological properties during a storage period of at least about two weeks.

Example 3

Two sample settable fluids were prepared comprising Class H cement and water, such that the density of each settable fluid was 16.5 pounds per gallon. A particle-size distribution-adjusting agent was then added to one sample settable fluid (Sample Composition No. 4). The particle size distribution of each sample composition was measured according to the following procedure. First, cement was added to a circulating stream of water, at which point the particle-size distribution of the mixture was measured. For Sample Composition No. 4, a known amount of the particle-size distribution-adjusting agent was then added to the circulating stream, and the particle-size distribution was again measured; additional amounts of the particle-size distribution-adjusting agent were added, and additional particle-size distribution measurements were taken, until no further change in particle size was observed.

The particle sizes in the sample settable fluids were measured on a Malvern Particle Size Analyzer, available from Malvern Instruments Ltd., of Worcestershire, UK. For a given particle size, the Particle Size Analyzer identifies the volume percentage of particles in the sample that are beneath that particle size. The Particle Size Analyzer also provides a median particle size. Another parameter reported by the Particle Size Analyzer is the "Span," which describes the width of the distribution independent of the median particle size. The Particle Size Analyzer also reports the "Uniformity" of the particle-size distribution, which is a measure of the absolute deviation from the median particle size, and which is also independent of the median particle size. The lower the value reported for the "Uniformity," the smaller the absolute deviation from the median particle size, and thus the more uniform the settable fluid.

Sample Composition No. 3 did not further comprise a particle-size distribution-adjusting agent.

Sample Composition No. 4, a settable fluid of the present invention, further comprised 0.233% bwoc of REDIBOND 5330 A.

Figure 2:
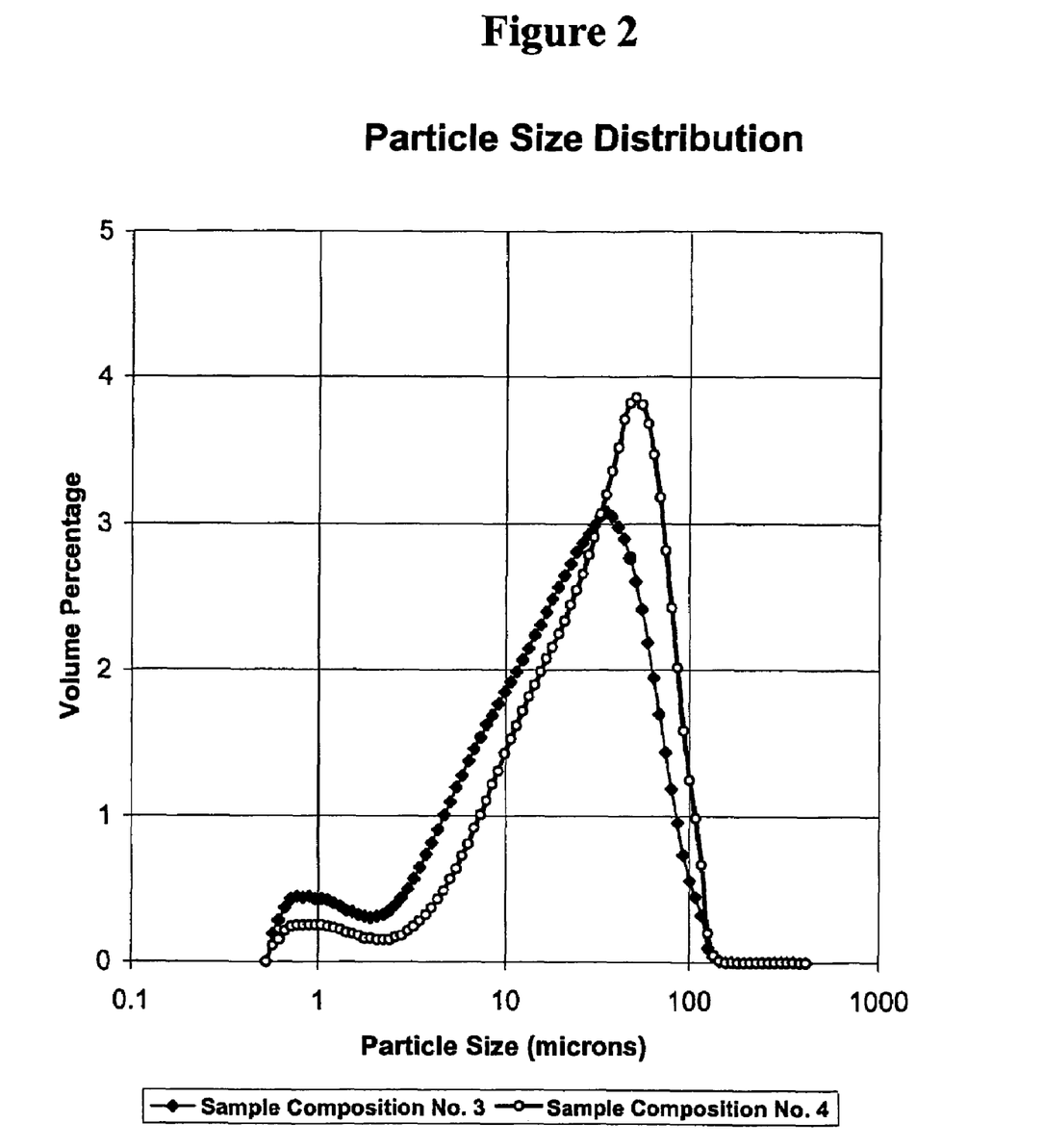
FIG. 2 depicts a graphical representation of the results of a particle-size distribution test performed on a variety of settable fluids, including exemplary embodiments of the settable fluids of the present invention.
Figure 3:
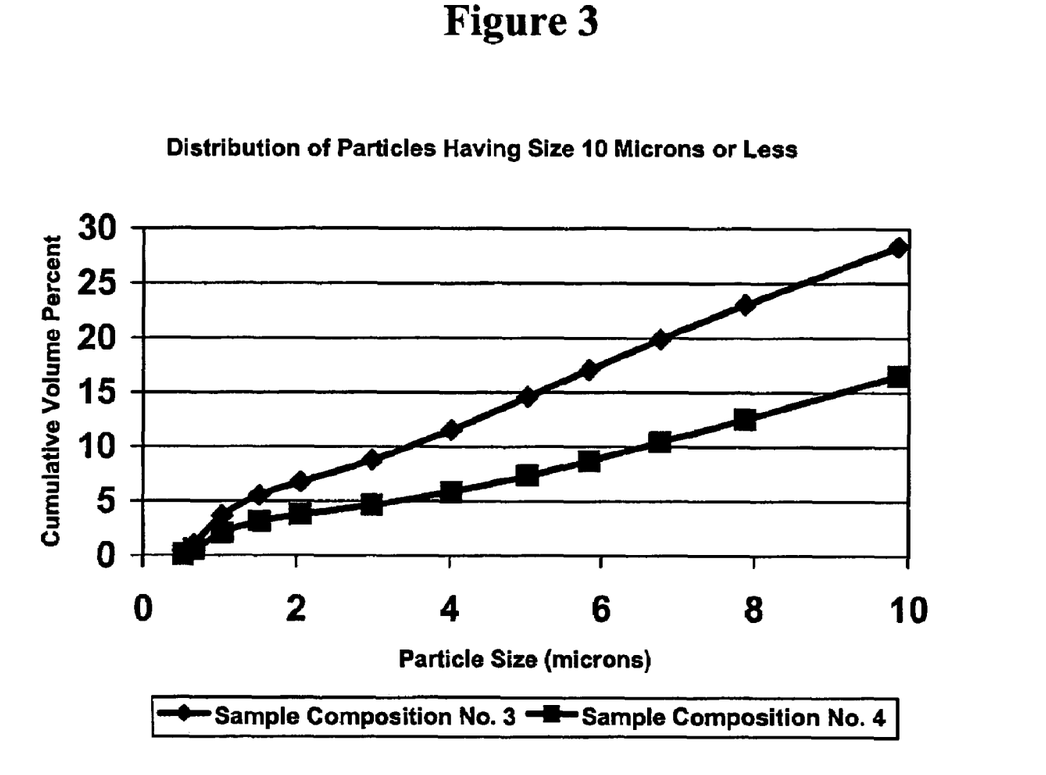
FIG. 3 depicts a graphical representation of the results of a particle-size distribution test performed on a variety of settable fluids, including exemplary embodiments of the settable fluids of the present invention.

The results of the particle-size distribution tests are reproduced in Tables 3, 4, 5, and 6, below, and also in FIGS. 2, 3, and 4.

TABLE 3

| Indicated Particle Size | Individual Volume Percent of Particles Having Indicated Particle Size | |
|---|---|---|
| (microns) | Sample Composition No. 3 | Sample Composition No. 4 |
| 0.667 | 0.37 | 0.21 |
| 1.04 | 0.43 | 0.25 |
| 1.52 | 0.34 | 0.19 |
| 2.05 | 0.31 | 0.15 |
| 2.98 | 0.5 | 0.21 |
| 4.02 | 0.82 | 0.37 |
| 5.03 | 1.1 | 0.57 |
| 5.84 | 1.28 | 0.73 |
| 6.78 | 1.46 | 0.92 |
| 7.88 | 1.63 | 1.11 |
| 9.86 | 1.85 | 1.43 |

TABLE 4

| Indicated Particle Size | Individual Volume Percent of Particles Having Indicated Particle Size | |
|---|---|---|
| (microns) | Sample Composition No. 3 | Sample Composition No. 4 |
| 10.62 | 1.92 | 1.53 |
| 20.84 | 2.65 | 2.35 |
| 30.29 | 2.99 | 2.91 |
| 40.86 | 2.98 | 3.52 |
| 51.15 | 2.61 | 3.86 |
| 59.41 | 2.19 | 3.68 |
| 69 | 1.7 | 3.18 |
| 74.36 | 1.44 | 2.82 |
| 86.36 | 0.96 | 2.02 |
| 93.07 | 0.74 | 1.59 |
| 100.3 | 0.56 | 1.25 |

TABLE 5

| Indicated Particle Size | Cumulative Volume % of Particles Having A Particle Size Less Than The Indicated Particle Size | |
|---|---|---|
| (microns) | Sample Composition No. 3 | Sample Composition No. 4 |
| 0.532 | 0.17 | 0.09 |
| 0.667 | 1.01 | 0.56 |
| 1.04 | 3.64 | 2.05 |
| 1.52 | 5.53 | 3.13 |
| 2.05 | 6.77 | 3.78 |
| 2.98 | 8.77 | 4.64 |
| 4.02 | 11.55 | 5.85 |
| 5.03 | 14.57 | 7.34 |
| 5.84 | 17.05 | 8.71 |
| 6.78 | 19.89 | 10.44 |
| 7.88 | 23.06 | 12.56 |
| 9.86 | 28.37 | 16.52 |

TABLE 6

| Indicated Particle Size (microns) | Cumulative Volume % of Particles Having A Particle Size Less Than The Indicated Particle Size | |
|---|---|---|
| | Sample Composition No. 3 | Sample Composition No. 4 |
| 10.62 | 30.29 | 18.05 |
| 20.84 | 51.16 | 35.93 |
| 30.29 | 65.49 | 49.29 |
| 40.86 | 77.65 | 62.44 |
| 51.15 | 85.93 | 73.83 |
| 59.41 | 90.54 | 81.32 |
| 69 | 94.19 | 87.97 |
| 74.36 | 95.63 | 90.79 |
| 86.36 | 97.78 | 95.24 |
| 93.07 | 98.52 | 96.83 |
| 100.3 | 99.08 | 98.08 |
| Median Particle Size | 26.35 | 35.79 |
| Span | 2.72 | 2.38 |
| Uniformity | 0.855 | 0.797 |

The above example illustrates, inter alia, that the settable fluids of the present invention, comprising particle-size distribution-adjusting agents, demonstrate improved uniformity and homogeneity of particle-size distribution.

Example 4

Sample Composition No. 5 comprised Class G cement, to which 40.00% water bwoc was added. Next, 0.267% HALAD-9 bwoc was added, along with 0.098% CFR-6 bwoc, 0.233% bwoc REDIBOND 5330 A, and 0.933% DEQUEST 2006 bwoc. The density of Sample Composition No. 5 was measured to be 16.32 ppg.

The rheology of Sample Composition No. 5 was measured using a Fann 35 Rheometer. The results are set forth in the table below.

TABLE 7

| | Fann 35 Rheometer Settings (rpm) | | | | | |
|---|---|---|---|---|---|---|
| Day | 600 | 300 | 200 | 100 | 6 | 3 |
| 0 | 282 | 165 | 121 | 72 | 26 | 21 |
| 3 | 300 | 179 | 132 | 82 | 31 | 27 |
| 7 | 298 | 185 | 135 | 83 | 31 | 26 |
| 9 | 295 | 191 | 142 | 90 | 46 | 34 |
| 11 | 310 | 201 | 151 | 102 | 60 | 54 |

The above example demonstrates, inter alia, that settable fluids of the present invention comprising Class G cement substantially maintain their original rheological properties for at least about two weeks.

Example 5

Sample Composition No. 6 comprised Class A cement, to which 42.00% water bwoc was added. Next, 0.534% HALAD-9 bwoc was added, along with 0.098% CFR-6 bwoc, 0.233% bwoc REDIBOND 5330 A, and 0.933% DEQUEST 2006 bwoc. The density of Sample Composition No. 6 was measured to be 16.03 ppg.

The rheology of Sample Composition No. 6 was measured using a Fann 35 Rheometer. The results are set forth in the table below.

TABLE 8

| | Fann 35 Rheometer Settings (rpm) | | | | | |
|---|---|---|---|---|---|---|
| Day | 600 | 300 | 200 | 100 | 6 | 3 |
| 0 | 323 | 186 | 134 | 78 | 15 | 12 |
| 3 | 284 | 164 | 119 | 67 | 7 | 4 |
| 5 | 285 | 166 | 119 | 68 | 8 | 5 |
| 7 | 308 | 186 | 134 | 76 | 9 | 7 |
| 11 | 308 | 192 | 140 | 82 | 12 | 9 |

The above example demonstrates, inter alia, that settable fluids of the present invention comprising Class A cement may maintain their original rheological properties for at least about two weeks.

Example 6

Sample Composition No. 7 had a composition identical to that in Sample Composition No. 2, except that DEQUEST 2006 was replaced by a molar equivalent of DEQUEST 2000.

The rheology of Sample Composition No. 7 was measured using a Fann 35 Rheometer. The results are set forth in the table below.

TABLE 9

| | Fann 35 Rheometer Settings (rpm) | | | | | |
|---|---|---|---|---|---|---|
| Day | 600 | 300 | 200 | 100 | 6 | 3 |
| 0 | 340 | 194 | 142 | 82 | 18 | 14 |
| 2 | 460 | 280 | 210 | 124 | 24 | 18 |
| 4 | 450 | 270 | 192 | 116 | 26 | 20 |
| 8 | 400 | 256 | 194 | 124 | 56 | 44 |
| 10 | 430 | 264 | 200 | 134 | 82 | 68 |

On Day 12, Sample Composition No. 7 was too thick for its viscosity to be measured.

The above example illustrates, inter alia, that settable fluids of the present invention comprising DEQUEST 2000 may maintain their original rheological properties for at least about two weeks.

Example 7

Sample Composition No. 8 comprised Class H cement, 34.52% water bwoc, 0.267% HALAD-9 bwoc, 0.098% CFR-6 bwoc, 0.933% DEQUEST 2000 bwoc, and 0.233% REDIBOND 5330 A bwoc. The density of Sample Composition No. 8 was measured to be 16.76 ppg.

The rheology and the free water content of the slurry were measured at the indicated time intervals in Table 10. Additionally, a composite of the slurry was activated at the time intervals reported in Table 10, and the set times were measured. The activator composition comprised 3.78% water bwoc, 0.07% TEA bwoc, and 0.75% sodium hydroxide bwoc. The density of Sample Composition No. 8, after the injection of the activator composition, was measured to be 16.5 ppg. The results of the testing are set forth in the table below:

TABLE 10

| | Fann 35 Rheometer Settings (rpm) | | | | | | Set Time | |
|---|---|---|---|---|---|---|---|---|
| Day | 600 | 300 | 200 | 100 | 6 | 3 | (hrs) | Free Water % |
| 1 | >300 | 223 | 159 | 92 | 18 | 16 | 4:00 | 0.4% |
| 4 | >300 | 222 | 152 | 80 | 9 | 6 | 3:20 | 0.8% |
| 7 | >300 | 229 | 160 | 86 | 11 | 8 | 4:00 | 0.8% |
| 10 | >300 | 274 | 193 | 109 | 18 | 16 | 3:45 | 0.8% |

The above example demonstrates, inter alia, that the settable fluids of the present composition may be taken from storage at any time within about two weeks or more after their initial preparation, activated with an activator composition of the present invention, to be utilized in a desired application. The storage time did not appear to significantly affect the set characteristics or other properties of the cement.

On Day 4, the density of a set composite of Sample Composition No. 8 was measured at the top, middle, and bottom, by mechanically separating the Sample Composition into top, middle, and bottom portions, and measuring the density of each portion. The top set density was measured to be 16.96 lb/gallon. The middle set density was measured to be 17.12 lb/gallon. The bottom set density was measured to be 17.24 lb/gallon. This demonstrates, inter alia, that the slurry suspension parameters of the settable fluids of the present invention are substantially uniform, with minimum settling.

Example 8

Sample settable fluids were prepared, each having a composition identical to that of Sample Composition No. 2, except that each comprised a different combination of various activators.

Sample Composition No. 9 did not comprise an activator.

Sample Composition No. 10 comprised 0.5% TEA bwoc.

Sample Composition No. 11 comprised 0.75% sodium hydroxide bwoc.

Sample Composition No. 12 comprised 0.75% sodium hydroxide bwoc and 2% calcium chloride bwoc.

Sample Composition No. 13 comprised 0.5% TEA bwoc and 0.75% sodium hydroxide bwoc, an activator composition of the present invention.

The results of the testing are reproduced in the table below.

TABLE 11

| Sample No. | TEA % bwoc | NaOH % bwoc | CaCl$_2$ % bwoc | 24 Hour Compressive Strength at 190 F. | Thickening Time (hrs:min) at 190 F. |
|---|---|---|---|---|---|
| Sample Composition No. 9 | 0 | 0 | 0 | 103 psi | 6:00 |
| Sample Composition No. 10 | 0.5 | 0 | 0 | 50 psi | 0:47 |
| Sample Composition No. 11 | 0 | 0.75 | 0 | Did not set | 6:50 |
| Sample Composition No. 12 | 0 | 0.75 | 2.0 | 50 psi | Not measured |
| Sample Composition No. 13 | 0.5 | 0.75 | 0 | 4,750 psi | 0:29 |

The above example demonstrates, inter alia, the possible effect of combining an alkali metal hydroxide and TEA in the activator compositions of the present invention.

Example 9

Sample settable fluids were prepared having a composition identical to that of Sample Composition No. 2, further comprising 0.07% TEA bwoc, and various amounts of sodium hydroxide, to determine the effect of sodium hydroxide on thickening time and compressive strength development.

Sample Composition No. 14 comprised 0.11% sodium hydroxide bwoc.

Sample Composition No. 15 comprised 0.75% sodium hydroxide bwoc.

Sample Composition No. 16 comprised 1.0% sodium hydroxide bwoc.

The results of the testing are set forth in the table below, as well as in FIG. 5 and FIG. 6.

TABLE 12

| Sample No. | TEA % bwoc | NaOH % bwoc | Time to 500 psi strength (hours) | 24 Hour Compressive Strength at 190 F. | Thickening Time (hrs:min) at 190 F. |
|---|---|---|---|---|---|
| Sample Composition No. 14 | 0.07 | 0.11 | 42 | 50 psi | 10:27 |
| Sample Composition No. 15 | 0.07 | 0.75 | 18 | 3,537 psi | 6:00 |
| Sample Composition No. 16 | 0.07 | 1.0 | 12 | 3,840 psi | 4:06 |

Figure 4:
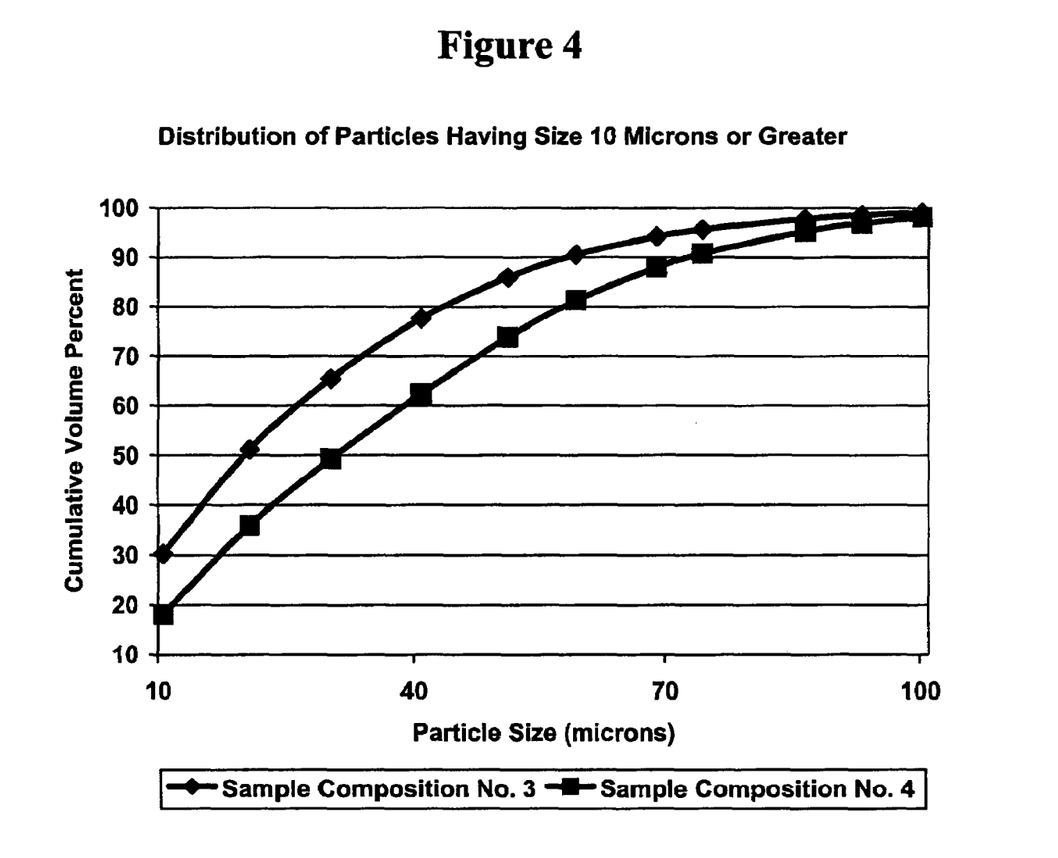
FIG. 4 depicts a graphical representation of the results of a particle-size distribution test performed on a variety of settable fluids, including exemplary embodiments of the settable fluids of the present invention.
Figure 5:
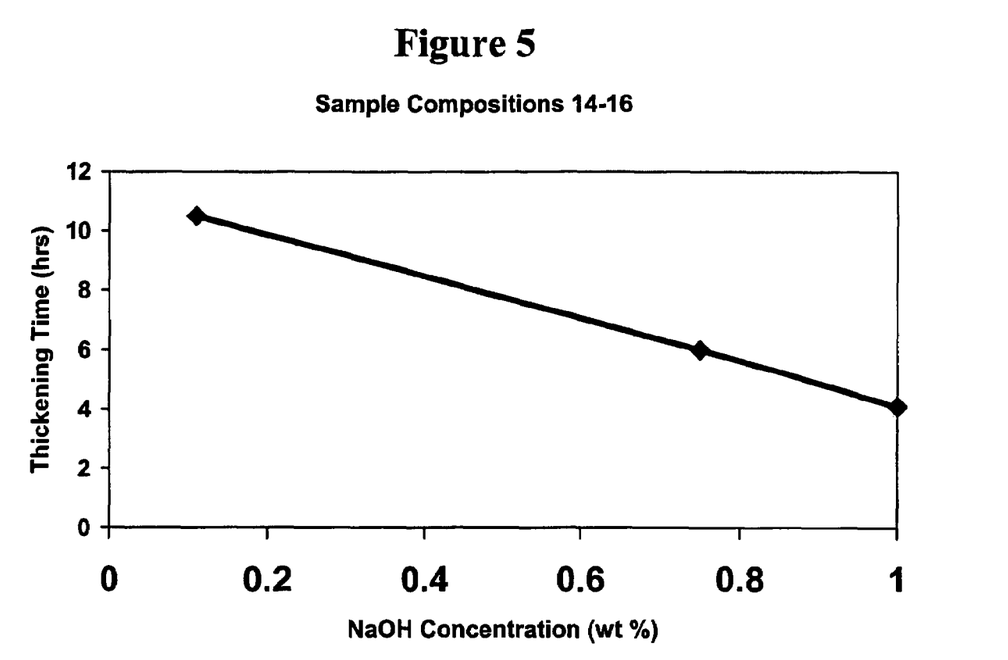
FIG. 5 depicts a graphical representation of the results of a thickening time test performed on exemplary embodiments of the settable fluids of the present invention.
Figure 6:
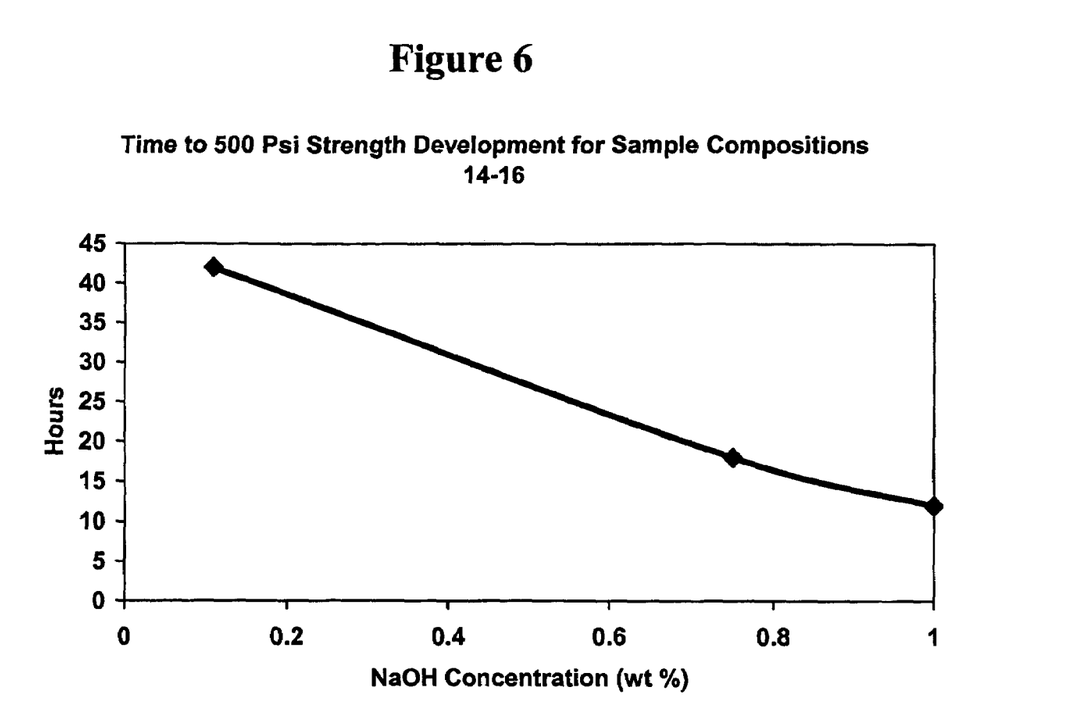
FIG. 6 depicts a graphical representation of the results of a compressive strength test performed on exemplary embodiments of settable fluids of the present invention.

As may be seen particularly with reference to FIGS. 4 and 5, the presence of sodium hydroxide in the activator compositions of the present invention may impart a substantially linear effect on thickening time and compressive strength development.

Therefore, the present invention is well adapted to carry out the objects and attain the ends and advantages mentioned as well as those that are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of drilling in a subterranean formation comprising the step of drilling a well bore in a subterranean formation using a drilling fluid comprising a cement, a set retarder, and a particle-size distribution-adjusting agent.

2. The method of claim 1 further comprising placing a casing string within the well bore.

3. The method of claim 1 further comprising mixing an activator composition with the drilling fluid.

4. The method of claim 3 wherein the activator composition is added in an amount sufficient to enable the drilling fluid to achieve a desired compressive strength in a desired thickening time.

5. The method of claim 3 wherein the activator composition is added in an amount in the range of from about 0.1 to about 5% by weight of the cement.

6. The method of claim 3 wherein the activator composition comprises a mixture of trialkanolamine and an alkali or alkaline earth metal hydroxide.

7. The method of claim 6 wherein the trialkanolamine is a triethanolamine, a tripropanolamine, a triisopropanolamine, or a mixture thereof.

8. The method of claim 6 wherein the alkali or alkaline earth metal hydroxide is sodium hydroxide, potassium hydroxide, or a mixture thereof.

9. The method of claim 8 wherein the alkali metal hydroxide comprises sodium hydroxide.

10. The method of claim 6 wherein the trialkanolamine is present in an amount in the range of from about 0.1% to about 50% by weight of the activator composition.

11. The method of claim 6 wherein the alkali metal hydroxide is present in an amount in the range of from about 50% to about 99.9% by weight of the activator composition.

12. The method of claim 1 further comprising permitting the drilling fluid to set behind the casing string.

13. The method of claim 1 wherein the drilling fluid further comprises water, and wherein the water is fresh water, salt water, brine, sea water, or a mixture thereof.

14. The method of claim 13 wherein the water is present in the drilling fluid in an amount in the range of from about 25% to about 150% by weight of the cement.

15. The method of claim 1 wherein the cement comprises at least one cement selected from the group consisting of: a Portland cement, a pozzolana cement, a gypsum cement, a high alumina cement, a silica cement, a high-alkalinity cement, and any mixture thereof.

16. The method of claim 1 wherein the drilling fluid further comprises a yield stress reducing agent.

17. The method of claim 16 wherein the yield stress reducing agent comprises at least one yield stress reducing agent selected from the group consisting of: a sulfonated melamine formaldehyde condensate; a sulfonated napthalene condensate; a sulfite adduct of an acetone formaldehyde condensate; and any mixture thereof.

18. The method of claim 1 wherein the set retarder comprises at least one set retarder selected from the group consisting of: a phosphonic acid, a phosphonic acid derivative, and any mixture thereof.

19. The method of claim 18 wherein the phosphonic acid derivative comprises a sodium salt of phosphonic acid.

20. The method of claim 1 wherein the set retarder is present in the drilling fluid in an amount in the range of from about 0.1% to about 5% by weight of the cement.

21. The method of claim 1 wherein the particle-size distribution-adjusting agent is present in the drilling fluid in an amount in the range of from about 0.01% to about 4% by weight of the cement.

22. The method of claim 1 wherein the particle-size distribution-adjusting agent comprises a cationic polymer.

23. The method of claim 22 wherein the cationic polymer comprises at least one cationic polymer selected from the group consisting of: a cationic polyacrylamide; a cationic hydroxyethyl cellulose; a poly(dimethyldiallylammonium chloride); a cationic starch; and any mixture thereof.

24. A method of drilling in a subterranean formation comprising the steps of:
drilling a well bore in a subterranean formation using a drilling fluid comprising a cement, a set retarder, and a particle-size distribution-adjusting agent; and
mixing an activator composition with the drilling fluid.

25. The method of claim 24 further comprising the step of permitting the drilling fluid to set.

26. The method of claim 24 further comprising the step of placing a casing string within the well bore.

27. The method of claim 24 further comprising the step of permitting the drilling fluid to set behind the casing string.

28. The method of claim 24 wherein the drilling fluid further comprises water, and wherein the water is fresh water, salt water, brine, sea water, or a mixture thereof.

29. The method of claim 28 wherein the water is present in the drilling fluid in an amount in the range of from about 25% to about 150% by weight of the cement.

30. The method of claim 24 wherein the cement comprises at least one cement selected from the group consisting of: a Portland cement, a pozzolana cement, a gypsum cement, a high alumina cement, a silica cement, a high-alkalinity cement, and any mixture thereof.

31. The method of claim 24 wherein the drilling fluid further comprises a yield stress reducing agent.

32. The method of claim 31 wherein the yield stress reducing agent comprises at least one yield stress reducing agent selected from the group consisting of: a sulfonated melamine formaldehyde condensate; a sulfonated napthalene condensate; a sulfite adduct of an acetone formaldehyde condensate; and any mixture thereof.

33. The method of claim 24 wherein the set retarder comprises at least one set retarder selected from the group consisting of: a phosphonic acid, a phosphonic acid derivative, and any mixture thereof.

34. The method of claim 33 wherein the phosphonic acid derivative comprises a sodium salt of phosphonic acid.

35. The method of claim 24 wherein the set retarder is present in the drilling fluid in an amount in the range of from about 0.1% to about 5% by weight of the cement.

36. The method of claim 24 wherein the activator composition is added in an amount in the range of from about 0.1 to about 5% by weight of the cement.

37. The method of claim 24 wherein the activator composition comprises a mixture of trialkanolamine and an alkali or alkaline earth metal hydroxide.

38. The method of claim 37 wherein the trialkanolamine is a triethanolamine, a tripropanolamine, a triisopropanolamine, or a mixture thereof.

39. The method of claim 37 wherein the alkali or alkaline earth metal hydroxide is sodium hydroxide, potassium hydroxide, or a mixture thereof.

40. The method of claim 37 wherein the trialkanolamine is present in an amount in the range of from about 0.1% to about 50% by weight of the activator composition.

41. The method of claim 37 wherein the alkali metal hydroxide is present in an amount in the range of from about 50% to about 99.9% by weight of the activator composition.

42. The method of claim 37 wherein the alkali metal hydroxide comprises sodium hydroxide.

43. The method of claim 24 wherein the particle-size distribution-adjusting agent is present in the drilling fluid in an amount in the range of from about 0.01% to about 4% by weight of the cement.

44. The method of claim 24 wherein the particle-size distribution-adjusting agent comprises a cationic polymer.

45. The method of claim 44 wherein the cationic polymer comprises at least one cationic polymer selected from the group consisting of: a cationic polyacrylamide; a cationic hydroxyethyl cellulose; a poly(dimethyldiallylammonium chloride); a cationic starch; and any mixture thereof.

* * * * *